Figure 1:
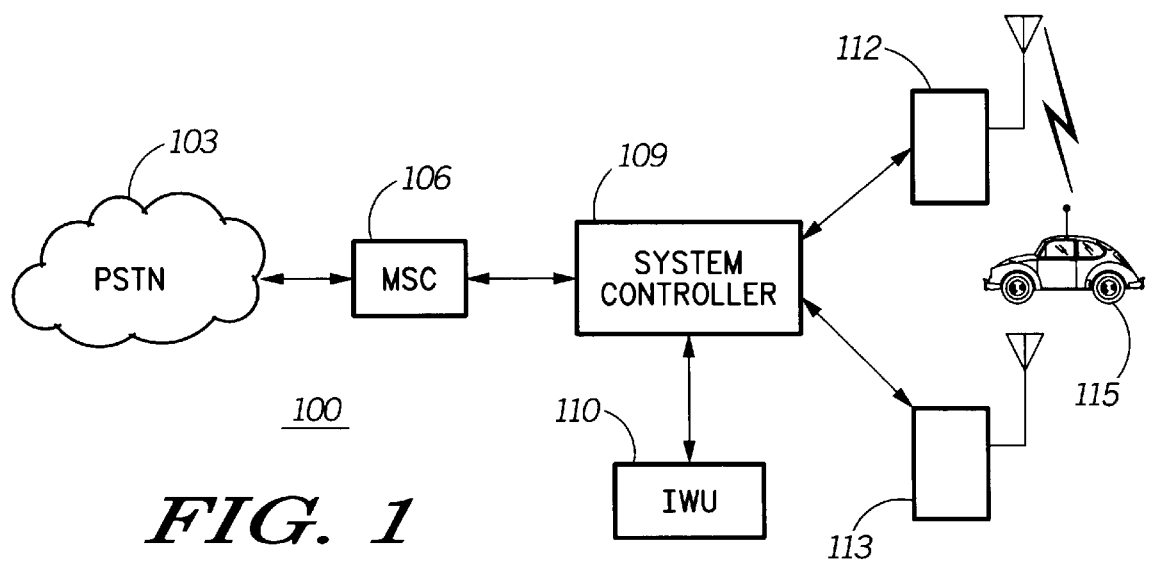

United States Patent
Lin

[19]

[11] Patent Number: 5,883,897
[45] Date of Patent: Mar. 16, 1999

[54] METHOD AND APPARATUS FOR PROVIDING SYNCHRONIZATION DURING TRANSCODER SWITCHING IN A COMMUNICATION SYSTEM

[75] Inventor: Harn-Jier Lin, Bartlett, Ill.

[73] Assignee: Motorola, Inc., Schaumburg, Ill.

[21] Appl. No.: 845,293

[22] Filed: Apr. 25, 1997

[51] Int. Cl.$^6$ .................. H04J 3/16; H04J 3/22
[52] U.S. Cl. ........................... 370/465; 370/350
[58] Field of Search .................. 370/216, 217, 370/218, 221, 464, 465, 469, 350, 503; 375/220, 222, 223, 354; 455/502

[56] References Cited

U.S. PATENT DOCUMENTS

| | | | |
|---|---|---|---|
| 5,475,686 | 12/1995 | Bach et al. | 370/465 |
| 5,483,531 | 1/1996 | Jouin et al. | 370/466 |
| 5,497,396 | 3/1996 | Delprat | 370/466 |

*Primary Examiner*—Ajit Patel
*Attorney, Agent, or Firm*—Richard A. Sonnentag

[57] ABSTRACT

A mobile station (115) and its supporting infrastructure equipment negotiate service configurations based on the service option capabilities of both the mobile station (115) and the infrastructure equipment. This negotiation process is performed via a traffic channel which is primarily intended for carrying vocoded voice information. The infrastructure equipment manages the capabilities of the transcoder circuits and checks the transcoder availability before proposing or accepting a particular service configuration. When a mutual service configuration is reached, the infrastructure equipment reallocates a new transcoder circuit based on its service option capability and the precheck of the transcoder availability and informs the mobile station (115) when to reset its layer 2 (L2) sequence number via an ACTION_TIME parameter. After switching transcoders, the infrastructure equipment and the mobile station (115) reset their respective sequence numbers at the ACTION_TIME to complete L2 synchronization during transcoder switching.

18 Claims, 3 Drawing Sheets

METHOD AND APPARATUS FOR PROVIDING SYNCHRONIZATION DURING TRANSCODER SWITCHING IN A COMMUNICATION SYSTEM

FIELD OF THE INVENTION

The present invention relates generally to synchronization in communication systems, and, more particularly, to synchronization during transcoder switching in communication systems.

BACKGROUND OF THE INVENTION

In current wireless communication systems, a mobile station and its supporting infrastructure equipment are able to negotiate with one another to reach a particular service configuration. This negotiation process is typically referred to as a service negotiation procedure. The reason a negotiation is necessary is that, in some instances, the mobile station may request certain services from the infrastructure equipment which are not supported by the infrastructure equipment, and vice versa.

To implement the service negotiation procedure, the services are assigned service options. As an example, within the infrastructure equipment, a plurality of different transcoders can be utilized in the infrastructure equipment. However, when a communication between the infrastructure equipment and the mobile station is established, only one type of transcoder within the infrastructure equipment is assigned to the particular communication. If, during the communication, the mobile station requests a different type of transcoder to be implemented (because a different service is requested), the service negotiation procedure is implemented in an attempt to accommodate the request of the mobile station. However, a major problem within the infrastructure equipment is that, during transcoder switching, synchronization at the signaling layer (typically Layer 2, or L2) between the particular transcoder and the mobile station is lost. As in any communication system, once L2 synchronization is lost it is difficult to regain in an efficient matter.

Thus, a need exists for an efficient method and apparatus for providing L2 synchronization during transcoder switching.

BRIEF DESCRIPTION OF THE DRAWINGS

FIG. 1 generally depicts a communication system which is capable of beneficially providing L2 synchronization during transcoder switching in accordance with the invention.

FIG. 2 generally depicts signaling layers implemented between base-stations and mobile stations within the communication system of FIG. 1.

FIG. 3 generally depicts portions of a system controller implemented to provide L2 synchronization during transcoder switching in accordance with the invention.

FIG. 4 generally depicts a diagram showing the messages exchanged to provide L2 synchronization during transcoder switching in accordance with the invention.

FIG. 5 generally depicts a diagram showing the messages exchanged to provide L2 synchronization in an alternate embodiment of transcoder switching in accordance with the invention.

DETAILED DESCRIPTION OF A PREFERRED EMBODIMENT

A mobile station and its supporting infrastructure equipment negotiate service configurations based on the service option capabilities of both the mobile station and the infrastructure equipment. This negotiation process is performed via a traffic channel which is primarily intended for carrying vocoded voice information. The infrastructure equipment manages the capabilities of the transcoder circuits and checks the transcoder availability before proposing or accepting a particular service configuration. When a mutual service configuration is reached, the infrastructure equipment reallocates a new transcoder circuit based on its service option capability and the precheck of the transcoder availability and informs the mobile station when to reset its layer 2 (L2) sequence number via an ACTION_TIME parameter. After switching transcoders, the infrastructure equipment and the mobile station reset their respective sequence numbers at the ACTION_TIME to complete L2 synchronization during transcoder switching.

In scenarios where a particular communication is being changed to a transfer of all data information, the infrastructure equipment connects the newly allocated transcoder circuit to an interworking unit (IWU) to bring up a predetermined protocol stack after a radio link protocol (RLP) L2 synchronization procedure which starts at the ACTION_TIME. After the predetermined protocol stack is in place, the IWU requests the infrastructure equipment to connect the IWU circuit to a terrestrial circuit originally allocated for the communication. If a new transcoder circuit is needed due to a negotiation, the originally allocated transcoder circuit and its associated connection to the terrestrial circuit and connection to the traffic channel is freed.

Stated more specifically, a method of providing synchronization during transcoder switching in a communication system is disclosed. The communication system includes a base-station which is responsive to a mobile station via a communication resource. Information conveyed via the communication resource is transcoded by a first transcoder. The method of providing synchronization during transcoder switching includes the steps of determining that a switch to a second transcoder is necessary and switching to the second transcoder. At this point, the second transcoder and the mobile station are synchronized such that the information conveyed to the mobile station is transcoded by the second transcoder via the communication resource.

In the preferred embodiment, the first and second transcoders implement either a fax service option, data only coding, 8 kilobits per second (kbps), 13 kbps, an enhanced variable rate (EVRC) transcoder or any other type of coder compatible with the communication system. The synchronization occurs by synchronizing a sequence number in both the second transcoder and the mobile station, more specifically by resetting a sequence number in both the second transcoder and the mobile station. The step of determining is performed at a system controller which resides within the infrastructure equipment of the communication system. The step of determining is in response to either a request external to the infrastructure equipment or a request internal to the infrastructure equipment, where the request external to the infrastructure equipment is based on requirements of the mobile station or a user within a public switched telephone network (PSTN) and the request internal to the infrastructure equipment is based on a failure of the first transcoder, system capacity requirements or voice quality requirements. The synchronization occurs at a layer 2 (L2) protocol layer.

A corresponding apparatus for providing synchronization during transcoder switching in a communication system is also disclosed, where the communication system includes a base-station responsive to a mobile station via a communication resource and information conveyed via the communication resource is transcoded by a first transcoder. The apparatus includes a means for determining that a switch to a second transcoder is necessary, a means for switching to the second transcoder and a means for synchronizing the second transcoder and the mobile station such that the information conveyed to the mobile station is transcoded by the second transcoder via the communication resource. The means for synchronizing includes a parameter which indicates to the mobile station and the second transcoder when to begin communication. The means for determining is responsive to either a request from a mobile station to change transcoders or a signal from the first transcoder indicating its failure.

A method of providing synchronization during transcoder switching in a communication system is also disclosed which includes the steps of determining that a switch to a second transcoder is necessary, setting a parameter which indicates to the mobile station and the second transcoder when to begin communication with one another, switching to the second transcoder and establishing, based on the parameter, a communication with the mobile station via the second transcoder and the communication resource without the mobile station and the second transcoder losing synchronization. The parameter is labeled an ACTION_TIME parameter and the communication between the mobile station and the second transcoder is established without losing layer 2 (L2) synchronization between the mobile station and the second transcoder. The mobile station is connected to a terrestrial circuit via an interworking unit (IWU) when the second transcoder is capable of supporting a data communication, the connection being established via signaling utilizing a radio link protocol (RLP). As in each of the examples provided, the communication system is compatible with a code division multiple access (CDMA) cellular or personal communication system.

FIG. 1 generally depicts a communication system 100 which beneficially implements L2 synchronization in accordance with the invention. In the embodiment depicted in FIG. 1, the communication system 100 is implemented utilizing a code-division multiple access (CDMA) radiotelephone system which is compatible with Interim Standard (IS) 95-A and supports the Service Connect message. For more information on IS-95-A, see TIA/EIA/IS-95-A, Mobile Station-Base Station Compatibility Standard for Dual Mode Wideband Spread Spectrum Cellular System, March 1995. In an alternate embodiment, the CDMA radiotelephone system 100 could also be compatible with ANSI J-STD-008, Personal Station-Base Station Compatibility Requirements for 1.8 to 2.0 GHz Code Division Multiple Access (CDMA) Personal Communication Systems, August 1995. As one of ordinary skill in the art will appreciate, various other types of communication systems which suffer from lack/loss of L2 synchronization during transcoder switching may beneficially employ the present invention. For example, one other type of system which suffers from lack of L2 synchronization during transcoder switching is a time-division multiple access (TDMA) communication system.

As shown in FIG. 1, a public switched telephone network 103 (PSTN) is coupled to a mobile switching center 106 (MSC). As is well known in the art, the PSTN 103 provides wireline switching capability while the MSC 106 provides switching capability related to the CDMA radiotelephone portion of the system 100. Also coupled to the MSC 106 is a system controller 109 which includes the apparatus and method for synchronizing during transcoder switching in accordance with the invention. Coupled to the system controller 109 is an Interworking Unit (IWU) 110 which handles data communications to/from the mobile station 115 within the communication system 100. While the switching capability of the MSC 106, the control capability of the controller 109 and the data handling capability of the IWU are shown as distributed in FIG. 1, one of ordinary skill in the art will appreciate that the various functions could be combined in a common physical entity for system implementation. The controller 109 also controls the routing of signals to/from base-stations 112–113, where the base-stations 112–113 are responsible for communicating with a mobile station 115. In the context of FIG. 1, the infrastructure equipment is generally comprised of the system controller 109, the base-stations 112–113 and the IWU 110.

Figure 2:
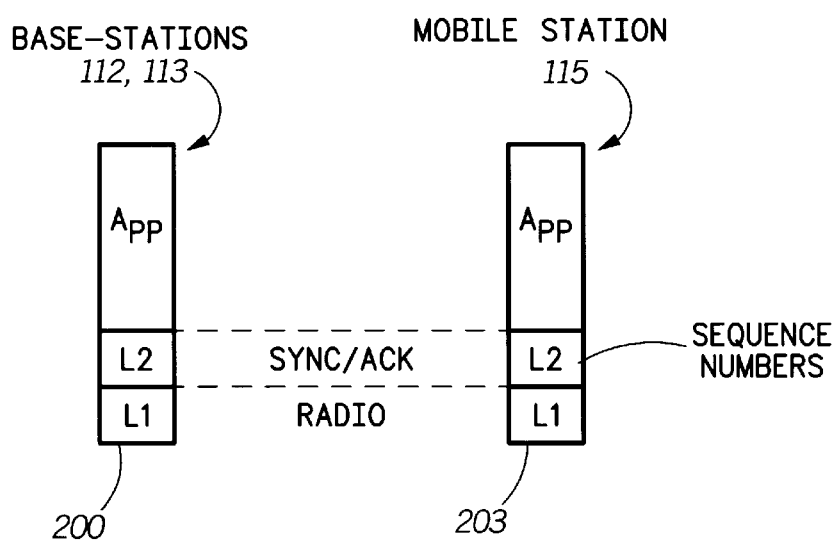

FIG. 2 generally depicts signaling layers implemented between base-stations 112–113 and the mobile station 115 within the communication system 100. As shown in FIG. 2, the signaling layers 200 and 203 corresponding to the base-stations 112–113 and the mobile station 115, respectively, are essentially identical. Using the signaling layer depiction 200 as an example, the first layer (L1) is typically dedicated for air-interface signaling dedicated to the radio link. In other words, all messaging associated with the radio link occurs at L1. The second layer shown in signaling stack 200 is that of layer 2 (L2). Within L2, signaling related to L2 synchronization and acknowledgment between the base-stations 112–113 and the mobile station 115 is performed. In the preferred embodiment, when transcoder switching occurs, it is this layer which loses the L2 synchronization between the infrastructure equipment and the mobile station 115. The layer L2 includes sequence numbers which help keep track of L2 synchronization during the associated signaling for synchronization. Shown above L2 in the signaling stack 200 is an applications layer, which generally provides signaling related to the type of applications supported by the base-stations 112–113 and the mobile station 115.

Figure 3:
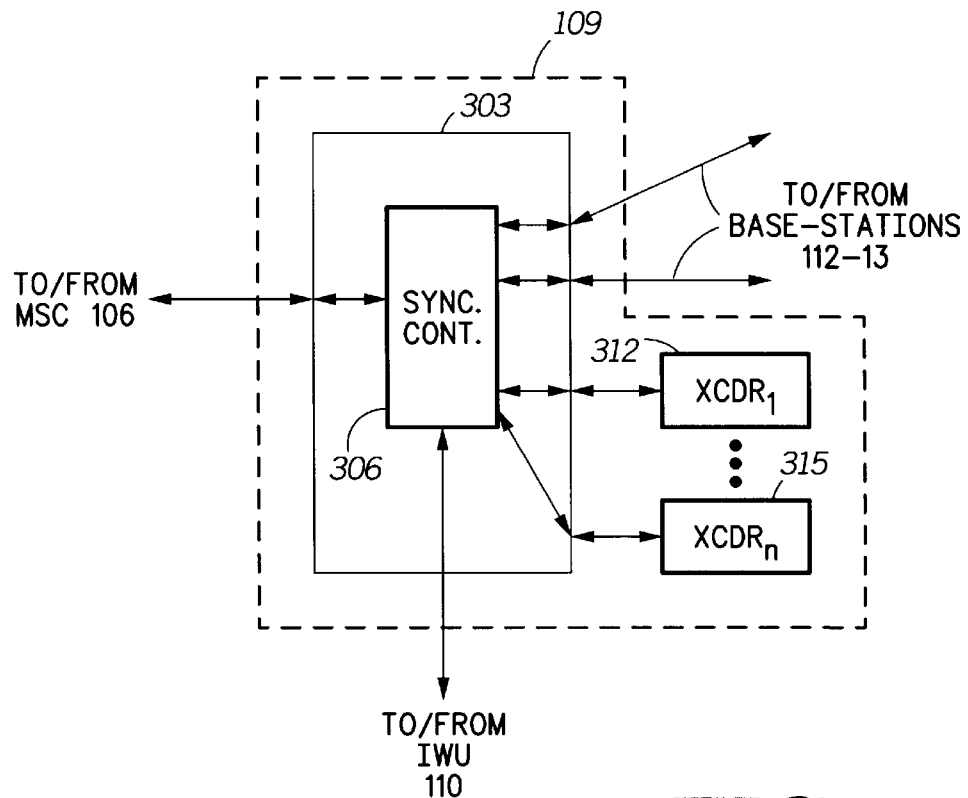

FIG. 3 generally depicts portions of the system controller 109 implemented to provide L2 synchronization during transcoder switching in accordance with the invention. As shown in FIG. 3, a switch 303 has as input and output the links to/from MSC 106 and also the links to/from the base-stations 112–113. It should be noted that the system controller 109 includes many other blocks which perform many other functions; FIG. 3 only depicts those blocks within the system controller 109 necessary to provide L2 synchronization in accordance with the invention.

Within the switch 303 resides a synchronization controller 306 which keeps track of the service option capabilities of the transcoders 312 and 315 and also tracks the availability of each transcoder 312 and 315. While only two transcoders 312 and 315 are shown in FIG. 3, one skilled in the art will appreciate that the system controller 109 may include many transcoders depending on the particular system configuration.

Also important to note in FIG. 3 is that the transcoder 312 and 315, while shown having a common marking (XCDR), may be transcoders which implement completely different services from one another. For example, transcoders 312 and 315 could implement fax service options, data only coding, 8 kilobits per second (kbps) voice coding, 13 kbps voice coding or enhanced variable rate (EVRC) voice coding. While these different types of transcoders are specifically mentioned herein, the method and apparatus for providing L2 synchronization during transcoding switching is not limited by the type or number of transcoders which may be switched.

Figure 4:
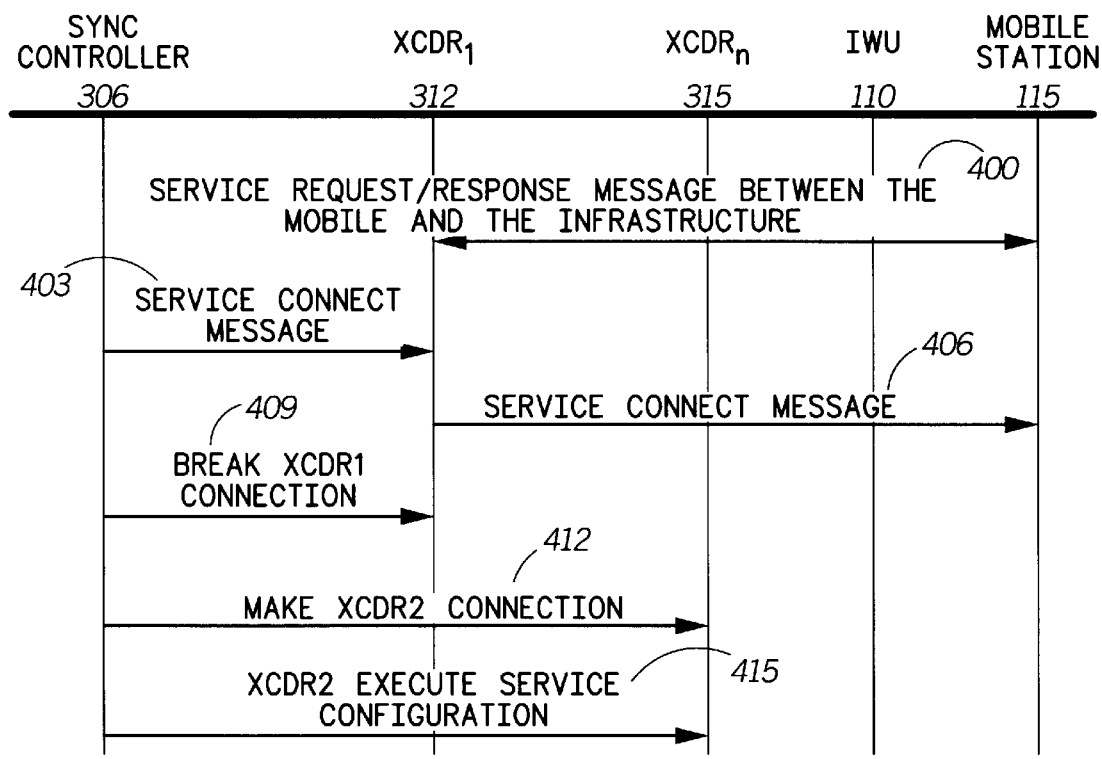

Reference is now made to FIG. 4, which generally depicts a messaging diagram to provide L2 synchronization during transcoder switching in accordance with the invention. With reference to FIG. 1, FIG. 3, and FIG. 4, the process begins at 400 when the first transcoder (XCDR$_1$) 312 and the mobile station begin the service negotiation procedure by transmitting a Service Request/Response message between one another. The synchronization controller 306 then sends at 403 a Service Connect message to XCDR$_1$ 312 which then relays at 406 the Service Connect message to the mobile station 115. The Service Connect message sent from the synchronization controller 306 to the mobile station 115 indicates when the new, negotiated service configuration is take effect (via a field within the message signifying the ACTION_TIME) and whether the L2 acknowledgment procedure needs to be reset (represented by a parameter RESET_L2). To implement the parameter ACTION_TIME, the sequence numbers within the L2 signaling level are utilized. Consequently, at the ACTION_TIME, the connection to XCDR$_1$ 312 is broken at 409, and the second transcoder (XCDR$_N$) 315 is connected at 412. Service configuration, including the ACTION_TIME information, for XCDR$_N$ 315 s then executed at 415, the sequence numbers within the mobile station 115 and XCDR$_N$ 315 are reset at the ACTION_TIME, and transcoder switching without loss of L2 synchronization is implemented in accordance with the invention.

While the above description has been focused on providing switching between transcoders which provide different types of service, and thus have different associated service options, the invention applies equally to scenarios where switching between transcoders with common service options is performed. For example, if XCDR$_1$ 312 and XCDR$_N$ 315 support the same services, a need for switching from XCDR$_1$ 312 to XCDR$_N$ 315 may still arise. For example, if XCDR$_1$ 312 is originally allocated to provide a particular service for the mobile station 115, switching to XCDR$_N$ 315 is necessary if a failure of XCDR$_1$ 312 occurs. In this scenario the synchronization controller 306, which keeps track of whether a particular transcoder is functioning properly, would detect that a failure in transcoder 312 has occurred. Using the same signaling as shown in FIG. 4, the synchronization controller 306 orchestrates a switching of the communication from the failed transcoder XCDR$_1$ 312 to the functioning transcoder XCDR$_N$ 315. The method of switching transcoders and providing L2 synchronization during transcoder switching for failed transcoders is the same as described for transcoders supporting different service options, but in this scenario, the request to switch is not requested from an entity external to the infrastructure equipment, but is instead requested by an internal entity. Specifically, in this alternate embodiment, the internal request is generated by the synchronization controller 306 based on a signal from XCDR$_1$ 312 that it has failed.

Important to note is that the request to switch transcoders from an entity external to the infrastructure equipment can originate not only from the mobile station 115, but also from the PSTN 103 side of the infrastructure equipment. For example, like the mobile station 115, may request the synchronization controller 306 to switch transcoders. Also important to note is the request to switch transcoders from an entity internal to the infrastructure equipment can originate for reasons other than a failure of one of the transcoders. For example, the synchronization controller 306 is capable of being configured such that, in areas where high system capacity is required, communications with mobile stations are forced to implement different service options which are known to improve capacity. As an example, switching between an 8 kbps vocoder and a 13 kbps vocoder, with everything else being equal, will cause a change in system capacity. As another example, the synchronization controller 306 is also capable of being configured such that, at some predetermined time of the day (i.e., the busiest time of the day), communications with mobile stations are forced to implement different service options which are known to improve capacity at the expense of voice quality. For the time of day when system capacity is not an issue (i.e., the middle of the night), communications with mobile stations are forced to implement other service options which are known to improve voice quality at the expense of system capacity.

Figure 5:
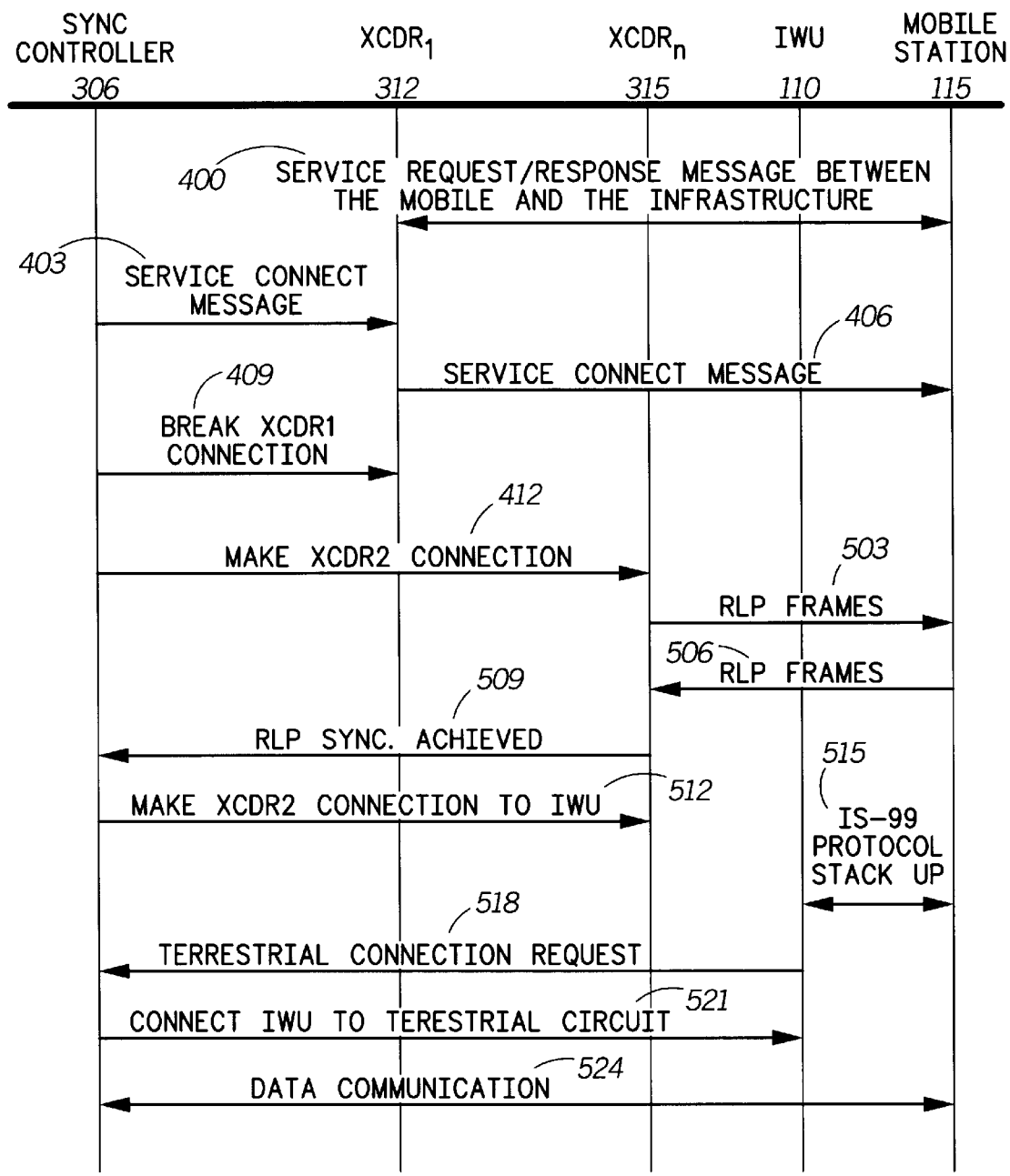

FIG. 5 generally depicts a diagram showing the messages exchanged to provide L2 synchronization in an alternate embodiment of transcoder switching in accordance with the invention. In this embodiment, XCDR$_1$ 312 of FIG. 3 is capable of supporting a voice coding service option (8 kbps, 13 kbps, EVRC, etc.) while XCDR$_N$ 315 is capable of supporting a data communication. When the mobile station 115 requests a data communication after a voice communication has been established, the messaging of steps 403–412 as shown in FIG. 4 are performed to synchronize the new transcoder XCDR$_N$ 315 with the mobile station 115 in accordance with the invention.

Referring to FIG. 5, additional steps are performed for switching to a data communication because the XCDR$_1$ 312 is completely unable to communicate with the IWU which handles the data communication. As such, after XCDR$_N$ 315 has been connected at step 412 of FIG. 5, radio link protocol (RLP) frames are transmitted from XCDR$_N$ 315 to the mobile station at step 503 and the mobile station 115 also transmits RLP frames to XCDR$_N$ 315 at step 506. After RLP synchronization has been achieved at step 509, the synchronization controller 306 connects XCDR$_N$ 315 to the IWU 110 at step 512. Signaling between the mobile station 115 and the IWU 110 occurs at step 515 to transfer a predetermined protocol stack. In the preferred embodiment, the predetermined protocol stack is an IS-99 protocol stack which is the data standard for IS-95A CDMA communication systems. For more information on IS-99, see TIA/EIA/IS-99, Data Service Option Standard for Wideband Spread Spectrum Digital Cellular System, 1995. After this signaling occurs at step 515, the data communication on the infrastructure equipment side of the communication system 100 is complete.

At this point in the messaging, the only remaining link that needs to be established is that from the IWU 110 to a terrestrial circuit (not shown). As such, at step 518 a terrestrial connection request is sent from the IWU 110 to the synchronization controller 306 to request the terrestrial circuit, and the IWU 110 is connected to the terrestrial circuit at step 521. As shown at step 524, all connections are complete and L2 synchronization during transcoder switching from the voice capable transcoder XCDR$_1$ 312 to the data capable transcoder XCDR$_N$ 315 is implemented in accordance with the invention.

While the invention has been particularly shown and described with reference to a particular embodiment, it will be understood by those skilled in the art that various changes in form and details may be made therein without departing from the spirit and scope of the invention. The corresponding structures, materials, acts and equivalents of all means or step plus function elements in the claims below are intended to include any structure, material, or acts for performing the functions in combination with other claimed elements as specifically claimed.

What I claim is:

1. A method of providing synchronization during transcoder switching in a communication system, the communication system including a base-station responsive to a mobile station via a communication resource, information conveyed via the communication resource being transcoded by a first transcoder, the method comprising the steps of:

determining that a switch to a second transcoder is necessary;

switching to the second transcoder; and synchronizing a sequence number related to synchronization and knowledgment signaling in the second transcoder and the mobile station such that the information conveyed to the mobile station is transcoded by the second transcoder via the communication resource.

2. The method of claim 1, wherein the first and second transcoders implement either a fax service option, data only coding, 8 kilobits per second (kbps), 13 kbps or an enhanced variable rate (EVRC) transcoder.

3. The method of claim 1, wherein the step of synchronizing a sequence number in both the second transcoder and the mobile station further comprises the step of resetting a sequence number in both the second transcoder and the mobile station.

4. The method of claim 1, wherein the step of determining is performed at a system controller within infrastructure equipment of the communication system.

5. The method of claim 4, wherein the step of determining is in response to either a request external to the infrastructure equipment or a request internal to the infrastructure equipment.

6. The method of claim 5, wherein the request external to the infrastructure equipment is based on requirements of the mobile station or a user within a public switched telephone network (PSTN) and the request internal to the infrastructure equipment is based on a failure of the first transcoder, system capacity requirements or voice quality requirements.

7. The method of claim 1, wherein the synchronization is layer 2 (L2) synchronization.

8. An apparatus for providing synchronization during transcoder switching in a communication system, the communication system including a base-station responsive to a mobile station via a communication resource, information conveyed via the communication resource being transcoded by a first transcoder, the apparatus comprising:

means for determining that a switch to a second transcoder is necessary;

means for switching to the second transcoder; and means for synchronizing the second transcoder and the mobile station, via a parameter which indicates to the mobile station and the second transcoder when to begin communication, such that the information conveyed to the mobile station is transcoded by the second transcoder via the communication resource.

9. The apparatus of claim 8, wherein the first and second transcoders implement either fax service option, data only coding, 8 kilobits per second (kbps), 13 kbps or an enhanced variable rate (EVRC) transcoder.

10. The apparatus of claim 8, wherein the means for synchronizing further comprises means for synchronizing a layer 2 (L2) protocol layer.

11. The method of claim 8, wherein the means for determining further comprises a system controller within infrastructure equipment of the communication system.

12. The method of claim 11, wherein the means for determining is responsive to either a request from a mobile station or a user within a public switched telephone network (PSTN) to change transcoders, a signal from the first transcoder indicating its failure, system capacity requirements or voice quality requirements configured within the system controller.

13. A method of providing synchronization during transcoder switching in a communication system, the communication system including a base-station responsive to a mobile station via a communication resource, information conveyed via the communication resource being transcoded by a first transcoder, the method comprising the steps of:

determining that a switch to a second transcoder is necessary;

setting a parameter which indicates to the mobile station and the second transcoder when to begin communication with one another;

switching to the second transcoder; and establishing, based on the parameter, a communication with the mobile station via the second transcoder and the communication resource without the mobile station and the second transcoder losing synchronization.

14. The method of claim 13, wherein the parameter is an ACTION_TIME parameter.

15. The method of claim 13, wherein the communication between the mobile station and the second transcoder is established without losing layer 2 (L2) synchronization between the mobile station and the second transcoder.

16. The method of claim 13, wherein the mobile station is connected to a terrestrial circuit via an interworking unit (IWU) when the second transcoder is capable of supporting a data communication.

17. The method of claim 13, wherein the connection between the mobile station and the terrestrial circuit via the IWU is established via signaling utilizing a radio link protocol (RLP).

18. The method of claim 13, wherein the communication system is compatible with a code division multiple access (CDMA) cellular or personal communication system.

* * * * *

UNITED STATES PATENT AND TRADEMARK OFFICE
CERTIFICATE OF CORRECTION

PATENT NO. : 5,883,897
DATED : March 16, 1999
INVENTOR(S) : Lin

It is certified that error appears in the above-indentified patent and that said Letters Patent is hereby corrected as shown below:

Column 7, line 12 reads "knowledgment", should be -- acknowledgment--

Signed and Sealed this

Thirteenth Day of July, 1999

Attest:

Q. TODD DICKINSON

*Attesting Officer*      *Acting Commissioner of Patents and Trademarks*